United States Patent [19]

Nishimura et al.

[11] 3,802,622
[45] Apr. 9, 1974

[54] REPOSITIONING APPARATUS FOR A NUMERICALLY CONTROLLED MACHINE TOOL

[75] Inventors: Hideo Nishimura, Kariya; Yoshio Shima, Obu, both of Japan

[73] Assignee: Toyoda Koki Kabushiki Kaisha, Kariya, Japan

[22] Filed: May 4, 1973

[21] Appl. No.: 357,085

[30] Foreign Application Priority Data
May 9, 1972  Japan.............................. 47-46209

[52] U.S. Cl............................ 235/151.11, 318/567
[51] Int. Cl.............................................. G06f 15/46
[58] Field of Search............... 235/151.11, 92 MP; 318/567, 569; 90/13 C

[56] References Cited
UNITED STATES PATENTS
3,691,357  9/1972  McIntosh...................... 235/151.11

Primary Examiner—Malcolm A. Morrison
Assistant Examiner—Jerry Smith
Attorney, Agent, or Firm—Oblon, Fisher, Spivak, McClelland & Maier

[57] ABSTRACT

Repositioning apparatus for automatically repositioning a machine movable element to its interrupted position. The position where a machining operation may be interrupted is programmed on a control tape. When the interruption instructions are read by a tape reader after an interruption switch is activated, the machining operation will automatically be interrupted. When the machining operation is desired to be restarted, the machine movable element is automatically retracted to a reference position and thereafter returned to the interrupted position from the reference position.

12 Claims, 4 Drawing Figures

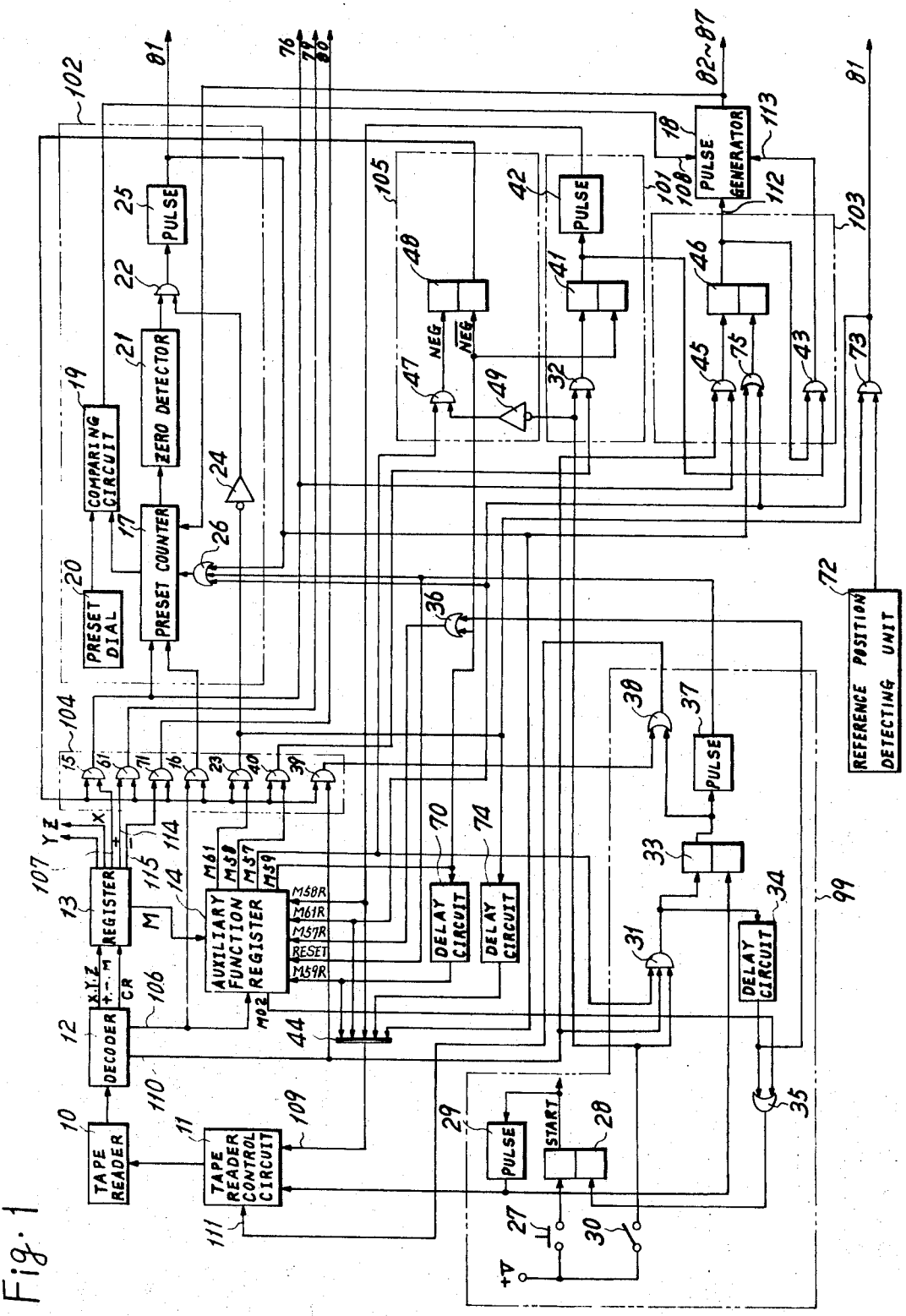

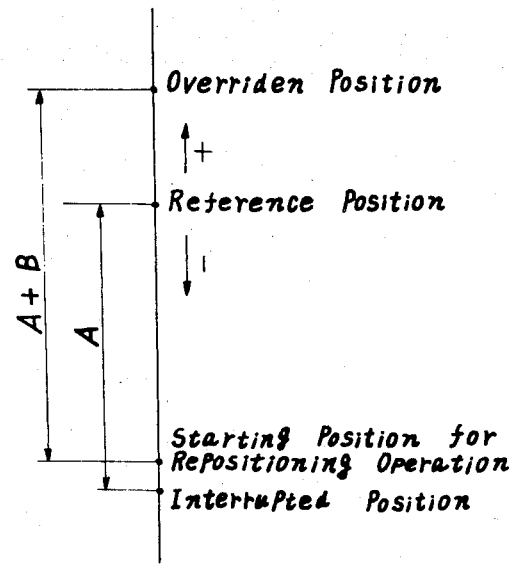
Fig. 4
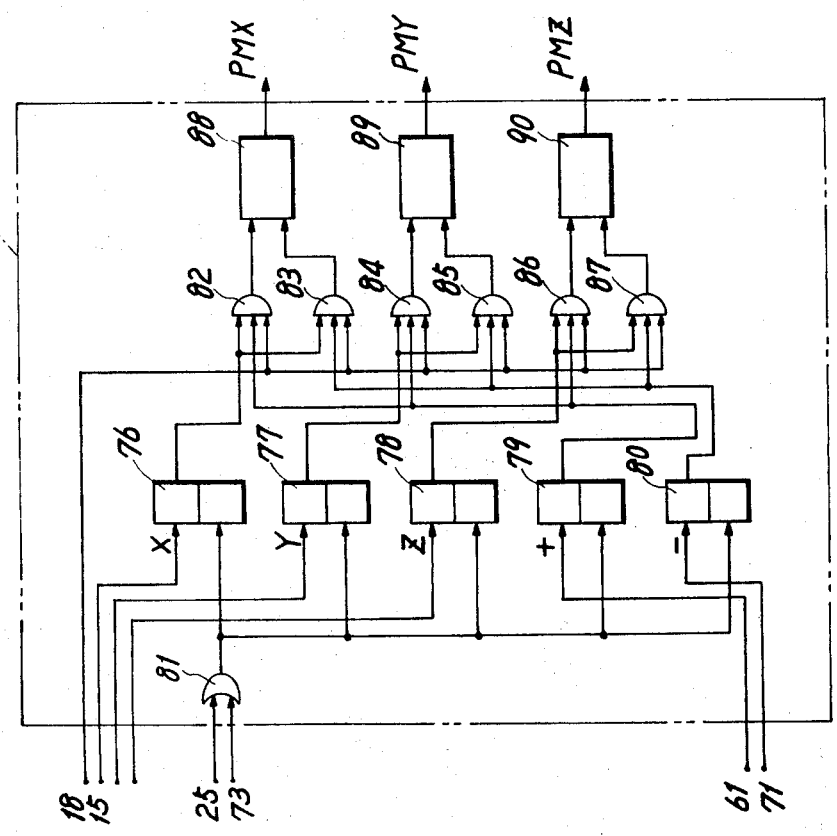
Fig. 2
Fig. 3

REPOSITIONING APPARATUS FOR A NUMERICALLY CONTROLLED MACHINE TOOL

BACKGROUND OF THE INVENTION

1. Field of the Invention

The present invention relates to repositioning apparatus and, more particularly to apparatus for automatically repositioning a machine movable element to its interrupted position.

2. Description of the Prior Art

Generally, in a numerically controlled machine tool, the motion of a machine movable element which is driven by a stepping motor is controlled as a function of the number of pulse signals supplied to the stepping motor. The rotor of the stepping motor is rotated by shifting the phase of energization of the coils therein and is maintained in a stopped position by the energized coils. However, when the electric power supply is interrupted during a particular machining operation, the coils which had been energized before the interruption of the electric power and the coils which are energized thereafter are not necessarily the same. Therefore, when the stepping motor is again supplied with electric power, the rotor thereof will be rotated by a small amount to undesirably change the position of the machine movable element.

When a machining operation in which several days are required to completely machine a workpiece is handled by a single numerically controlled machine tool, the operation thereof must be interrupted because of the working hours of the operator.

In this case, the position of the machine movable element, such as for example a table, will change due to the interruption of the power supply.

Conventionally, when the machining operation is restarted, the table must be manually retracted to the original or the reference position. A counter for indicating the position of the table is adjusted and the table must be manually repositioned to the interrupted position by using the counter in accordance with stored information with respect to the interrupted position. The operator of the machine is required to perform this careful and laborious job, whereby the machining efficiency is undesirably reduced.

SUMMARY OF THE INVENTION

It is, therefore, an object of the present invention to provide repositioning apparatus wherein the machine movable element is automatically retracted to a reference position and subsequently returned to the interrupted position when the electric power is supplied after the interruption thereof during the course of the machining operation.

The foregoing and other objects are attained in accordance with one aspect of the present invention through the provision of apparatus for interrupting the machining operation in accordance with programmed information after an interruption switch is activated. When the electric power is again supplied, the machine movable element is retracted to a reference position, and thereafter returned to the interrupted position in accordance with the programmed information, whereby the interrupted position and the restarting position of the machining operation will coincide.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a block diagram of a preferred embodiment of part of the repositioning apparatus according to the present invention;

FIG. 2 is a block diagram of another portion of the repositioning apparatus according to the present invention;

FIG. 3 is an example of a program for performing the repositioning operation in the apparatus of FIGS. 1 and 2; and FIG. 4 is an explanatory diagram helpful in understanding the repositioning operation according to the present invention.

DESCRIPTION OF THE PREFERRED EMBODIMENT

The repositioning apparatus according to the present invention performs the interruption of the operation and, when restarted, automatically repositions a machine movable element to the interrupted position in accordance with programmed information.

Referring now to the drawings, wherein like reference numerals designate identical or corresponding parts throughout the several views, and more particularly, to FIGS. 1 and 3 thereof which are seen to illustrate a preferred embodiment of the repositioning apparatus and a sample program, respectively. When the operation is required to be interrupted, the operator of the machine actuates an interruption switch 30. When the programmed instruction M57CR (shown in FIG. 3) is detected by a conventional tape reader 10, which may be for example, a PTR–400–P RICOM READER manufactured by RICOH DENSHI KOGYO CO. LTD. TOKYO, JAPAN, the detected information is supplied to a decoder 12 which decodes the instruction and supplies the same directly and through a register 13, to an auxiliary function register 14. The construction of auxiliary function register 14 is well within the purview of a person of ordinary skill in the art, and may be made, for example, by combining integrated circuit units SN 7442, SN 74175 and SN 7475 manufactured by Texas Instruments Incorporated, Dallas, Tex., U.S.A. The auxiliary function register 14 operates a start-stop control circuit 99 which, in turn, supplies a signal to a tape reader control circuit 11 to stop the same, whereby the operation of the machine is interrupted. The tape reader 11 may be of a conventional type, such as for example, the Basic IO control manufactured by Data General, Southboro, Mass., USA.

When the operation of the machine is required to be restarted, the operator of the machine presses the starting button 27. A signal will then be supplied to tape reader control circuit 11 from the start-stop control circuit 99 to advance the programmed tape whereby the next instruction M58CR will be detected by tape reader 10. The instruction M58CR is supplied through decoder 12 and register 13 to auxiliary function register 14 which, in turn, supplies a signal to a tape inching circuit 101. The output signal from tape inching circuit 101 is fed to tape reader 10 which advances the tape and thus, the next instruction $X+(A+B)CR$ is detected. The detected instruction is decoded and the information pertaining to the axis to be actuated, in this case the X-axis, is supplied to a pulse distributing circuit 121 (shown in FIG. 2), and the numerical information (A+B) is supplied to a counting circuit 102 and registered therein. The block end signal CR is supplied to a pulse generator control circuit 103. Being supplied with a signal from pulse generator control circuit 103, a pulse generator 18 supplies a series of pulse signals to counting circuit 102 and an X-axis stepping motor PMX through the pulse distributing circuit 121.

When the number of the pulse signals supplied to the stepping motor PMX becomes equal to the number registered in the counting circuit 102, the counting circuit 102 provides a signal to the pulse generator 18. The pulse generation of the pulse generator 18 is thereby stopped, whereupon the machine movable element is moved from the starting position for the repositioning operation to an override position, as diagrammatically illustrated in FIG. 4. The output signal from the counter circuit 102 advances the tape under the tape reading head so that the next instruction M61CR is detected by the tape reader 10. By a signal initiated by instruction M61CR, the reference position detecting unit 72 becomes operative and the counting circuit 102 becomes partly inoperative. When the next instruction X-BCR is detected by the tape reader 10, the instruction is decoded by the decoder 12 and the decoded information is supplied to the pulse distributing circuit 121, the counting circuit 102 and the pulse generator control circuit 103, whereby the stepping motor PMX is rotated to move the machine movable element in a minus direction through a distance B. When the machine movable element reaches the reference position, the reference position detecting unit 72 generates a signal which is supplied to the pulse generator control circuit 103 and the tape reader control circuit 11. This stops the operation of the pulse generator and advances the tape. The tape reader 10 then detects the next instruction X-ACR which is then distributed to the pulse distributing circuit 121, the counting circuit 102 and the pulse generator control circuit 103 in the same manner as in the case of the instruction X+(A+B)CR.

When the machine movable element is moved to the interrupt position, the counting circuit 102 generates a signal which stops the pulse generation of the pulse generator 18. Accordingly, the normal operation will be continuously performed. The next instruction M59CR is provided to control the gate circuit 104 by means of a gate control circuit 105.

When the interruption of the operation is not required, the operation will not be interrupted even if the interruption information M57CR is detected by the tape reader 10, since the gate control circuit 105 closes the gate circuit 104 and the instructions M58CR, X+(A+B)CR, M61CR, X—BCR and X—ACR will be disregarded.

When the instruction M59CR is detected by the tape reader 10, the signal initiated by the instruction M59CR will be supplied to the gate control circuit 105 so that the gate circuit 103 is opened so as to continue normal operation.

Referring again to FIGS. 1 and 3, a more detailed description of the invention will now be given. The tape reader 10 detects the programmed information stored on the tape (shown in FIG. 3) by a tape reading head (not shown). The tape reader control circuit 11 is connected to the tape reader 10 so as to control the operation thereof. Connected to the tape reader 10 is a decoder 12 which decodes the information detected by the tape reading head so as to distribute the decoded information to the appropriate devices. A register 13 is connected to the decoder 12 and registers the information X, Y, Z, +, − and M. The register 13 is reset shortly after a block end signal CR is supplied thereto from the decoder 12. An auxiliary function register 14 is connected to the decoder 12 and the register 13 to generate auxiliary function signals MO2, M57, M58, M59 and M61 by combining the command information M from the register 13 and the numerical data from the decoder 12.

A numerical data terminal 106 of the decoder 12, which supplies the numerical information, and the axis terminal 107 of the register 13, which supplies the information with respect to the axis to be actuated, are connected to a preset counter 17 through AND gates 15 and 16 so that numerical information on the amount of motion of the movable element, such as a table of the machine, will be supplied from the decoder 12 and registered in counting circuit 102.

The output terminal of pulse generator 18 is connected to the preset counter 17 so that the contents registered therein will be subtracted each time a pulse signal is supplied to the stepping motor PMX which moves the table. Connected to a preset dial 20 and the preset counter 17 are the input terminals of a comparing circuit 19 which generates a binary signal "1" when the contents of the preset counter 17 becomes smaller than the value preset by preset dial 20. The output of the comparing circuit 19 is supplied to a slow-down terminal 108 of the pulse generator 18 so that the frequency of the pulse signals generated thereby will be lowered.

A zero detector 21 produces a binary signal "1" when the contents of the preset counter 17 has been reduced to zero. The output terminal of the zero detector 21 is connected to an AND gate 22, the other input terminal of which is connected to a NOT gate 24 which is, in turn, connected to the terminal M61 of the auxiliary function register 14 through an AND gate 23. The output terminal of the AND gate 22 is connected to a pulse circuit 25 which changes the binary "1" into a single pulse signal. The output terminal of the pulse circuit 25 is connected to the reset terminal of the preset counter 17 through an OR gate 26 and to the tape inching terminal 109 of the tape reader control circuit 11 through an OR gate 44.

An electric voltage +V is impressed on one terminal of a starting button 27 and the set terminal of the flip-flop 28 is connected to the other terminal thereof. The output terminal of the flip-flop 28 is connected to the tape inching terminal 109 of the tape reader control circuit 11 through a pulse circuit 29. Electric voltage +V is impressed upon one terminal of an interruption switch 30 and the other terminal thereof is connected to the input terminals of AND gates 31 and 32.

The terminal M57 of the auxiliary function register 14 and the block end terminal 110 of the decoder 12 are connected to the AND gate 31, the output of which is, in turn, supplied to the set terminal of a flip-flop 33 and a delay circuit 34. The output terminal of the delay circuit 34 is connected to OR gates 35 and 36. The output of the OR gate 35 is connected to the reset terminal of the flip-flop 28. The other input terminal of the OR gate 35 is connected to the terminal M02 through which the auxiliary function register 14 supplies a signal when the machining operation is completed.

The output of pulse circuit 29 is supplied to the reset terminal of the flip-flop 33, the output of which is supplied to OR gate 38 and pulse circuit 37. The output of the pulse circuit 37 is supplied to the preset counter 17 through OR gate 26 and to the auxiliary function register 14 in order to reset the register 14 and the counter 7. The other input terminal of the OR gate 38 is supplied with the output of an AND gate 39 whose input terminal is connected to the block end terminal 110 of the decoder 12. The output terminal of the OR gate 38 is connected to the tape operation stop terminal 111 of the tape reader control circuit 11.

The terminal M58 of the auxiliary function register 14 is connected to an AND gate 40 which is, in turn, connected to the AND gate 32. The AND gate 32 is connected to the set terminal of a flip-flop 41 which is, in turn, connected to a pulse circuit 42. The pulse circuit 42 is connected to the OR gate 44 and the M58 reset terminal of the auxiliary function register 14.

The output of the AND gate 15 is supplied to an AND gate 45 which is also supplied with a signal from the block end terminal 110 of the decoder 12. The AND gate 45 supplies a signal to the set terminal of a flip-flop 46 which is connected to the starting terminal 112 of the pulse generator 18 and the AND gate 43. The output terminal of the AND gate 43 is connected to the quick feed terminal 113 of the pulse generator 18 so that the same supplies a series of high frequency pulse signals when supplied with a binary "1."

The terminal M57 of the auxiliary function register 14 is connected to an AND gate 47 whose output is supplied to the NEG terminal of flip-flop 48. The AND gate 47 is connected to the interruption switch 30 through a NOT gate 49.

The terminal M59 of the auxiliary function register 13 is connected to the reset terminal of the flip-flop 41, the $\overline{NEG}$ terminal of the flip-flop 48, OR gate 36 and delay circuit 70. The output terminal at $\overline{NEG}$ side of flip-flop 48 is connected to AND gates 15, 16, 23, 39, 40, 61 and 71. The AND gates 61 and 71 are respectively supplied with a signal from the signal terminals 114 and 115 of the register 13. The delay circuit 70 supplies its output to the OR gate 44 and the M59 reset terminal of the auxiliary function register 14.

A conventional reference position detecting unit 72, which may comprise, for example, a MAGNE SWITCH by SONY CORPORATION, TOKYO, JAPAN, produces a binary "1" when the machine movable element has been returned to the reference position and supplies the binary "1" to an AND gate 73, the other input terminal of which is connected to the terminal M61 of the auxiliary function register 14 through the AND gate 23. The output of the AND gate 73 is supplied to the M61 reset terminal of the auxiliary function register 13 and the OR gate 44, and furthermore, to the preset counter 17 through the OR gate 26. The output terminals of the AND gate 73 and the pulse circuit 25 are connected to the input terminals of OR gate 75, the output terminal of which is connected to the reset terminal of the flip-flop 46. The output terminal of the AND gate 23 is connected to the input terminal of the OR gate 44 through a delay circuit 74.

Referring now to FIG. 2, the set terminal of a flip-fop 76 for selecting the X-axis is connected to the axis terminal 107 of the register 13. The set terminals of flip-flops 77 and 78 for respectively selecting the Y and Z axes are also connected to the axis terminals of the register 13 in the same manner as the flip-flop 76. The set terminals of flip-flops 79 and 80 which select the directions (+, −) of rotation are connected to the direction terminals 114 and 115 of the register 13. The reset terminals of the flip-flops 76 to 80, inclusive, are connected to the pulse circuit 25 and the AND gate 73 through the OR gate 81. The output terminal of the pulse generator 18 and the output terminals of the flip-flops 76 to 80 inclusive are connected through AND gates 82 to 87 inclusive to pulse motors PMX, PMY and PMZ which are respectively provided for the X, Y and Z axes.

In operation, when the operational information is stored on a tape, a program such as shown in FIG. 3 is provided at the position where the operation may be interrupted. When the interruption is required, the operator actuates the interruption switch 30, but the machine operation still proceeds.

When the tape reader 10 detects the instruction M57 on the tape, it supplies the detected information M57 to the decoder 12 which, in turn, decodes the information. The numerical information "57" is directly supplied to register 14 via line 106, and the letter information "M" is supplied through the register 13 to the auxiliary function register 14, which in turn, supplies a binary "1" at the terminal M57. A short time period after the instruction is read by the tape reader 10, the block end information CR is read thereby and thus, the decoder 12 supplies a binary "1" to the register 13 to thereby reset the same.

Since the AND gate 31 is supplied with a binary "1" from the interruption switch 30, the terminal M57 and the block end terminal 110, the AND gate 31 outputs a binary "1" and thus, the flip-flop 33 is reversed. Flip-flop 33 then provides a binary "1" to the tape reader stop terminal 111 through the OR gate 38 in order to stop the operation of the tape reader 10. Furthermore, the binary "1" of the flip-flop 33 is furnished to the pulse circuit 37 which changes the binary "1" to a single pulse. The pulse signal is supplied to the reset terminals of the preset counter 17 and the auxiliary function register 14 so that the same are reset to thereby stop the operation of the machine.

The restarting operation of the machine, wherein a machine movable element, such as for example a table (X-axis), is desired to be repositioned to the interrupted position, will now be described.

When electric power is supplied to the apparatus, all of the flip-flops are reset by the application of the initial reset pulse signals to all of the reset terminals thereof (not shown). Thereafter, when the starting button 27 is pressed, the flip-flop 28 is reversed and supplies a binary "1" in order to start the machine. The binary "1" is changed into a single pulse signal by the pulse circuit 29 which is supplied to the tape reader control circuit 11. Accordingly, the tape reader 10 is activated and the instruction M58CR on the tape will be detected by the tape reader 10. The auxiliary function register 14 will thus supply a binary "1" through the terminal M58. Since the flip-flop 48 produces a signal at the $\overline{NEG}$ terminal by the initial reset pulse signal, both input terminals of the AND gate 40 are supplied with a binary "1" and thus, the same generates a binary "1." By the application of binary "1"'s to the AND gate 32 from the AND gate 40 and the interruption switch 30, the flip-flop 41 is reversed. It is to be noted that the interruption switch 30 is turned off by the operator after the operation is restarted. The output signal "1" of the flip-flop 41 is supplied to the pulse circuit 42, which, in turn, changes the signal "1" to a single pulse for supplying it to the M58 reset terminal (M58R) of the auxiliary function register 14 and the tape reader control circuit 11. Accordingly, the auxiliary function register 14 is reset only at the terminal M58 and the next instruction $X + (A+B)CR$ will be read by the tape reader 10. It is noted, referring to FIG. 4, that $A$ is the distance between the interrupted position and the reference position of the table, and $B$ is a predetermined appropriate distance by which the table is overridden through the reference position.

The instruction $X+(A+B)CR$ is discriminated by the decoder 12 and distributed to the register 13 and the preset counter 17 so that the register 13 provides a binary "1" from both the (+) direction terminal 114 and the $X$-axis terminal 107, and the preset counter 17 registers the numerical information $(A+B)$. When the information CR is read by the tape reader 10, the decoder 12 provides a binary "1" through the block end terminal 110 thereof to the AND gate 45. The AND gate 45 produces a binary "1" to the flip-flop 46, since the AND gate 45 is also supplied with a binary "1" from the register 13 through the AND gate 15. Accordingly, the flip-flop 46 is reversed and supplies a binary "1" to the start terminal 112 of the pulse generator 18 whereby the same generates a series of pulse signals. The AND gate 43 supplies a binary "1" to the rapid feed terminal 113 of the pulse generation 18 by the application of the outputs of the flip-flops 41 and 46, whereby the pulse generator 18 generates a series of high frequency pulse signals.

The flip-flops 76 and 79 of FIG. 2 are reversed when the binary "1" is supplied thereto by the register 13 and, in turn, supply a binary "1" to the AND gate 82. Accordingly, the pulse signals generated by the pulse generator 18 are supplied to the $X$-axis pulse motor PMX whereby the pulse motor is rotated in a plus direction so as to move the table in a plus direction at a rapid feed speed. At the same time, the pulse signals from generator 18 are supplied to the preset counter 17 and thus, the contents therein are subtracted one-by-one every time a pulse signal is supplied thereto. The comparing circuit 19 compares the content of the present counter 17 with that of the preset dial 20 and generates a binary "1" when the content in the preset counter 17 becomes smaller than that in the preset dial 20. The output of the comparing circuit 19 is supplied to the slow down terminal 108 of the pulse generator 18 and thus, the frequency of the pulse signals is decreased to thereby reduce the feed speed of the table. By subsequent applications of the pulse signals, the content of the preset counter 17 is reduced to zero and thus, the zero detector 21 generates a binary "1." The AND gate 22 supplies the binary "1" to the pulse circuit 25, since the same is supplied with the input "1" at both input terminals thereof from the zero detector 21 and the NOT gate 24, the NOT gate 24 not being supplied with a binary "1" from the auxiliary function register 14. Consequently, the pulse circuit 25 generates a single pulse signal which is supplied to the reset terminal of the flip-flop 46 through the OR gate 75 resulting in the resetting of flip-flop 46. Thus, the pulse generator 18 terminates the generation of the pulse signals to thereby stop the motion of the table. The pulse signal of the pulse circuit 25 is also supplied to the preset counter 17 and the reset terminals of the flip-flops 76 and 79 to reset the same, and furthermore is supplied to the tape inching terminal 109 through the OR gate 44 so that the tape is advanced.

When the next instruction M61CR is detected, the auxiliary function register 14 supplies a binary "1" through the terminal M61 and the AND gate 23 to the NOT gate 24 and therefore, the output of the NOT gate 24 ceases. The binary "1" through the terminal M61 is also supplied to the AND gate 73 and the delay circuit 74. Accordingly, the delay circuit 74 supplies a pulse signal with a short time delay to the tape inching terminal 109 to advance the tape and the next instruction X-BCR is detected by the tape reader 10. The instruction X-BCR is appropriately distributed in a manner similar to that described above, and the pulse generator 18 will generate a series of pulse signals.

However, contrary to the case of the instruction $X+(A+B)CR$, the register 13 will now supply a signal through the (−) direction terminal 115 so as to supply a binary "1" to the AND gate 83 by reversing the flip-flop 80. Accordingly, the pulse signals are supplied to the $X$-axis pulse motor PMX through the AND gate 83 and a pulse motor driving unit 88 to thereby rotate the same in a minus direction.

When the table approaches the reference position, the comparing circuit 19 supplies a binary "1" to the pulse generator 18 to thereby reduce the feed speed of the table. When the table is brought to the reference position, the reference position detecting unit 72 generates a binary "1" and delivers the same to the AND gate 73. The AND gate 73 supplies a binary "1" to the preset terminal of the flip-flop 46 through the OR gate 75, since the AND gate 73 is also supplied with a binary "1" from the terminal M61 of the auxiliary function register 14. Therefore the flip-flop 46 is reset and the pulse generator 18 ceases its pulse generation and thus, naturally, the table will be positioned at the reference position.

It is noted that even if the content of the preset counter 17 becomes zero before the table is brought to the reference position, the table will continuously be brought to the reference position since the AND gate 22 does not produce a binary "1" because of the zero input from the NOT gate 24 and thus, the pulse circuit 25 does not generate any pulse signal to the flip-flop 46. The output "1" of the reference position detecting unit 72 is supplied to the preset counter 17 and to the reset terminals of the flip-flops 76 and 80 through the OR gates 26 and 81 to thereby reset the same, and furthermore is supplied to the M61 reset terminal of the auxiliary function register 14 to reset the same only at the output terminal M61. Furthermore, the output "1" of the reference position detecting unit 72 is supplied to the tape inching terminal 109, whereby the tape reader 10 reads the next instruction X−ACR. In accordance with the detected information X−ACR, the table is moved in a minus direction in the same manner as described above. Since the auxiliary function register 14 has been reset at the terminal M61, the NOT gate 24 provides a binary "1" to the AND gate 22 which permits pulse circuit 25 to generate a binary "1" to the flip-flop 46 when the zero detector 21 generates a binary "1" to the AND gate 22. Accordingly, the flip-flop 46 will be reset to thereby stop the pulse generation of the pulse generator 18 and the feed motion of the table.

In this manner, the table will be correctly positioned again at the interrupted position which is a distance A in the minus direction from the reference position. By means of the binary "1" output of the zero detector 21, the tape will be advanced and the tape reader 10 detects the next instruction M59CR. By the instruction M59CR, the auxiliary function register 14 supplies a binary "1" through the terminal M59 to the $\overline{\text{NEG}}$ terminal of the flip-flop 48 and thus, the cycle for repositioning the table at the interrupted position will be completed. The output "1" from the terminal M59 is delayed for a short period by the delay circuit 70, and thereafter is supplied to the M59 reset terminal of the auxiliary function register 14 to reset the same, and furthermore is supplied to the tape inching terminal 109 in order to advance the tape reader 10.

Subsequently, the machining operation will be continuously performed in accordance with the tape information. In the above description the X-axis or table repositioning is described for the pupose of clarification but it is understood that the Y or Z axes may also be controlled in the same manner by supplying information on the Y or Z axes.

In this preferred embodiment, the table is overridden through the reference position so that the position thereof is always counted from the same position (the reference position) when the table is being moved in the same direction (from right to left in FIG. 4). Accordingly, it is not necessary to override the reference position if the operation of the machine is interrupted when the table is located to the right side of the reference position. In this case, the interruption instructions will comprise M57CR, M58CR, M61CR, X−DCR, X+DCR and M59CR, D being the distance between the interrupted position and the reference position.

Suppose that the interruption is not required; the interruption switch 30 will thus be turned off. Accordingly, the output from the interruption switch 30 ceases and the NOT gate 49 produces an output "1" which is supplied to the AND gate 47. In this situation, the program proceeds and the instruction M57CR is detected by the tape reader 10. Thus, the auxiliary function register 14 supplies a binary "1" through the terminal M57 to the AND gate 47 which, in turn, supplies its output to the NEG terminal of the flip-flop 48 to reverse the same. Consequently, the gate circuit 104 is closed so that the block end signal from the decoder 12, and the outputs of the register 13 are not supplied to the other appropriate circuits and the other instructions M58CR, X+(A+B)CR, M61CR, X−BCR, X−ACR will be disregarded. It is to be noted that the tape reader 10 is continuously operated since the AND gate 31 is not supplied with the signal from the interruption switch 30 and the output from the terminal M57 is, therefore, not supplied to the flip-flop 33.

When the information M59CR is detected by the tape reader 10, the auxiliary function register 14 supplies a binary "1" through the terminal M59, which is supplied to the $\overline{\text{NEG}}$ terminal of the flip-flop 48 to thereby reverse the same.

Consequently, the flip-flop 48 provides a binary "1" to the gate circuit 104 and the gate circuit 104 is opened so that the succeeding machining operation will be performed in accordance with the tape information.

In the above-described embodiment, the machine is controlled in accordance with the information stored on the tape, but it is also possible to utilize the apparatus according to the present invention in a machine tool system controlled by a computer.

As understood from the above description when considered with the drawings, when the operation of the machine is restarted after the interruption, the machine movable elements are automatically retracted to the reference position and thereafter to the interrupted position. Accordingly, the laborious manual operations heretofore necessary for bringing the machine movable elements to the interrupted position are effectively avoided.

Obviously, many modifications and variations of the present invention are possible in the light of the above teachings. It is therefore to be understood that within the scope of the appended claims, the invention may be practiced otherwise than as specifically described herein.

What is claimed as new and desired to be secured by letters patent of the United States is:

1. Repositioning apparatus for automatically repositioning a movable element of a machine tool to an interrupted position in accordance with interruption instructions, comprising:

a pulse generator for generating a series of pulse signals to supply said machine tool;

start-stop control means for interrupting the operation of said machine tool in accordance with said interruption instructions and restarting the operation thereof;

a tape inching means responsive to said start-stop control means and said interruption instructions for advancing said interruption instructions;

counting means responsive to said interruption instructions for generating a signal to stop the pulse generation of said pulse generator when said movable element has been returned to said interrupted position;

pulse generator control means for controlling the pulse generation of a pulse motor in response to said interruption instructions; and reference position detecting means for supplying a signal to said pulse generator control means to stop the pulse generation of said pulse generator when said movable element reaches a reference position.

2. Repositioning apparatus for automatically repositioning a movable element of a machine tool to an interrupted position in accordance with a plurality of preprogrammed interruption instructions comprising:

a pulse generator for generating a series of pulse signals to supply said machine tool;

start-stop control means for interrupting the operation of said machine tool in accordance with a first interruption instruction and restarting the operation thereof;

a tape inching means responsive to said start- stop control means and a second interruption instruction for advancing said interruption instructions;

counting means responsive to a third instruction for generating a signal to stop the pulse generation of said pulse generator when said movable element has been overridden through a reference position, said counting means being irresponsive to fourth and fifth interruption instructions but responsive to a sixth interruption instruction for stopping said movable element at said interrupted position;

reference position detecting means for generating a signal to stop the pulse generation of said pulse generator when said movable element is being moved in accordance with said fifth interruption instruction; and pulse generator control means for moving said movable element through distances indicated by said third and sixth interruption instructions in cooperation with said counting means and through a distance indicated by said fifth interruption instruction in cooperation with said reference position detecting means.

3. Repositioning apparatus for automatically repositioning a movable element of a machine tool to an interrupted position in accordance with interruption instructions comprising:

a tape reader for detecting said interruption instructions;

means for controlling said tape reader;

means for distributing the information detected by said tape reader;

a pulse generator for generating a series of pulse signals to supply said machine tool;

start-stop control means for interrupting the operation of said machine tool in accordance with said interruption instructions and restarting the operation thereof;

a tape inching means responsive to said start-stop control means and said interruption instructions for advancing said interruption instructions;

counting means responsive to said interruption instructions for generating a signal to stop the pulse generation of said pulse generator when said movable element has been returned to said interrupted position;

pulse generator control means for controlling the pulse generation of pulse motor in response to said interruption instructions; and reference position detecting means for supplying a signal to said pulse generator control means to stop the pulse generation of said pulse generator when said movable element reaches a reference position.

4. Repositioning apparatus according to claim 3, wherein said counting means becomes inoperative in response to said interruption instructions when said machine movable element is moved towards said reference position in one direction.

5. Repositioning apparatus according to claim 3, wherein said counting means comprises:

a preset counter for detecting the position of said movable element;

a preset dial for presetting a predetermined distance;

means for comparing the contents of said preset counter and said preset dial and for supplying a signal to said pulse generator to reduce the frequency of the pulse signals; and zero detecting means connected to said preset counter for supplying a signal to said pulse generator control means to stop the pulse generation of said pulse generator when the contents of said preset counter is reduced to zero.

6. Repositioning apparatus according to claim 3, which further comprises control means connected to said start-stop control means and said distributing means for disregarding said interruption instructions when the interruption of the operation of said machine tool is not directed by said start-stop control means.

7. Repositioning apparatus according to claim 6, which further comprises means for distributing the pulse signals from said pulse generator to said machine tool.

8. Repositioning apparatus according to claim 6 wherein said control means comprises:

a gate control means connected to said start-stop control means and said distributing means; and gate means responsive to said gate control means for controlling the flow of signals from said distributing means.

9. Repositioning apparatus according to claim 8 wherein said gate means comprises a plurality of AND gates, one input terminal of said each AND gates being connected to said distributing means and the other input terminal thereof being connected to said gate control means.

10. Repositioning apparatus for automatically repositioning a movable element of a machine tool to an interrupted position in accordance with interruption instructions comprising:

a tape reader for detecting said interruption instructions;

a tape reader control means for controlling said tape reader;

distributing means for distributing the instructions detected by said tape reader;

a pulse generator for generating a series of pulse signals to supply said machine tool;

start-stop control means for interrupting the operation of said machine tool in accordance with a first interruption instruction and for restarting the operation thereof;

tape inching means responsive to said start-stop control means and a second interruption instruction for advancing said interruption instructions;

counting means responsive to a third instruction for generating a signal to stop the pulse generation of said pulse generator when said movable element has been overridden through a reference position, said counting means being irresponsive to fourth and fifth interruption instructions but responsive to a sixth interruption instruction for stopping said movable element at said interrupted position;

reference position detecting means for generating a signal to stop the pulse generation of said pulse generator when said movable element has reached said reference position while said movable element is being moved in accordance with said fifth interruption instruction; and pulse generator control means for moving said movable element through distances indicated by said third and sixth interruption instructions in cooperation with said counting means and through a distance indicated by said fifth interruption instruction in cooperation with said reference position detecting means.

11. Repositioning apparatus according to claim 10, which further comprises control means responsive to said first interruption instruction for disregarding said second, third, fourth, fifth and sixth interruption instructions when the interruption of the operation of said machine tool is not directed by said start-stop control means.

12. Repositioning apparatus according to claim 11, wherein said control means comprises:
   gate means for controlling the flow of signals from said distributing means; and
   gate control means responsive to a seventh interruption instruction for opening said gate means so that the signals from said distributing means may be passed through said gate means.

* * * * *